Ellis & Deming,
Cotton Planter.

No. 112,567. Patented Mar. 14, 1871.

Witnesses:
J. P. Varnum
E. C. Ray

D. C. Ellis
Geo. N. Deming
Inventors.
By their Attorney
H. P. K. Peck

United States Patent Office.

DE WITT C. ELLIS AND GEORGE N. DEMING, OF ROCHESTER, NEW YORK.

Letters Patent No. 112,567, dated March 14, 1871.

IMPROVEMENT IN COTTON-PLANTERS.

The Schedule referred to in these Letters Patent and making part of the same.

*To all whom it may concern:*

Be it known that we, DE WITT C. ELLIS and GEORGE N. DEMING, of Rochester, in the county of Monroe, in the State of New York, have invented a new and useful Improvement in Cotton-seed Planters; and we do hereby declare that the following is a full and exact description thereof, reference being had to the accompanying drawing and to the letters of reference marked thereon.

The difficulties experienced in the attempts to use machinery for planting cotton seed have mainly arisen from the fibrous nature of the seeds, which causes them to adhere to each other when any considerable quantity is bestowed in bulk. This tendency of the mass of seeds to hold together in the hopper of a machine has to be overcome by some mechanism which will efficiently operate to detach the individual seeds from the bulk, in order to produce a practical cotton-seed planter.

By repeated experiments with different kinds of separating and distributing machinery it was found that the use of a V-shaped hopper increased the tendency of the seeds to adhere and become compact at the bottom of the hopper; also, that rotating agitators, working vertically through the mass of seeds in the hopper, were not reliable as a means of preventing this difficulty.

After thoroughly testing many arrangements of various devices to effect the desired object, we organized our present machine with the cylindrical hopper, the curved rotating arms to feed the seed to the vertically-rotating distributer, and it has proven successful in operation.

The leading object of our invention is to provide means of detaching seeds from the lower surface of a bulk of seeds in the hopper, and to avoid the use of rotating arms arranged to work through the mass of seeds, such an arrangement having been tried by us and found to be inefficient, and exhaustive of the power used to propel the machine. This led to the arrangement of flattened rotating radial arms upon the bottom of the hopper, so that they should not pass through the mass of seeds in the hopper, but should glide smoothly and easily under the body of seeds, causing openings or vacant spaces to be continuously made in rear of the arms, and between the lower stratums of seeds and the hopper-bottom, into which openings the seeds, detached from the lower surface of the mass by the action of the arms, will fall.

Our invention consists in the arrangement of horizontally-rotating feeding-arms upon the level bottom of the cylindrical hopper, in combination with a vertically-rotating distributer working in a slot at the periphery of the hopper-bottom, the parts being constructed and operated by a system of gearing hereinafter fully set forth.

Our machine is organized to plant two rows of seeds at the same time, and these rows may be planted at a greater or lesser distance apart by adjusting the two sets of planting mechanism upon the frame of the machine.

The frame A is supported upon the axle B of the driving-wheels C, which are provided with ratchet-and-pawl connections, so as to operate the planting mechanism by the advancing movement of either wheel.

The two cylindrical hoppers D D are each supported upon four legs, $i$, which are fastened by screws or other means to the two cross-pieces $a$ $b$ of the frame A.

Figure 1:
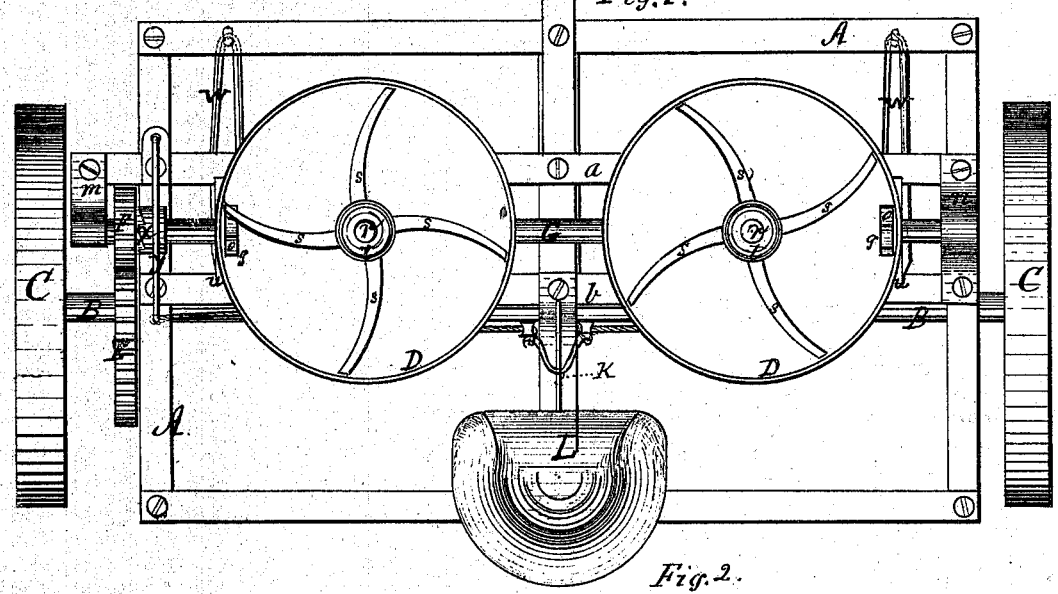
Figure 1 represents a top view or plan of our improved planter.

The axle B carries the large cogged wheel E, which meshes into the pinion F on the gear-shaft G, and the latter has its bearings in suitable journal-boxes in the brackets $m$ $n$, which are secured upon the main frame, as represented in fig. 1 of the drawing.

The toothed distributing-wheels $o$ $o$ and the beveled pinions $p$ $p$ may be secured upon the gear-shaft G by keys, so that they can be adjusted toward or from each other.

The large beveled gear-wheels H are fastened upon the lower ends of the short counter-shafts $r$, which extend up through boxes secured at the bottoms of hoppers D D.

The curved radial arms $s$ are connected with the counter-shafts $r$, immediately above the hopper-bottoms, to rotate thereon, and the conical nuts $t$ secure the shafts in position.

Figure 2:
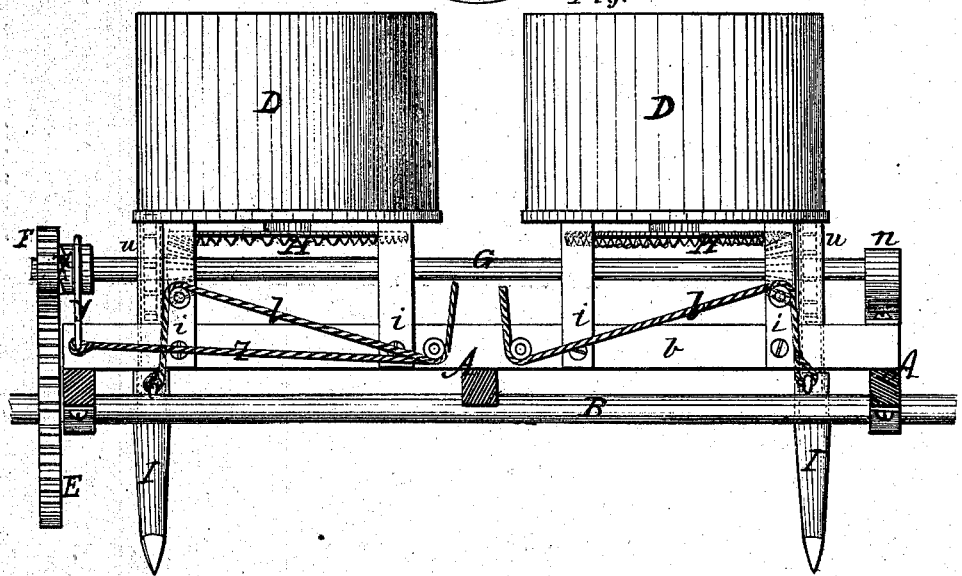
Figure 2 represents a rear elevation of the same without the carrying-wheels, a portion of the frame, and the driver's seat.
Figure 3:
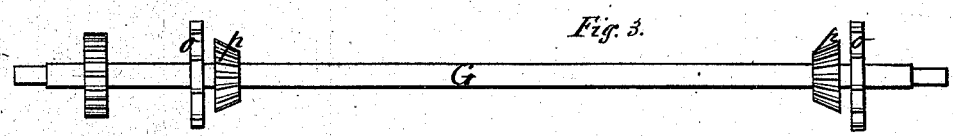
Figure 3 represents the gear-shaft and its gearing, and the distributing-wheels.

The distributing-wheels $o$ are incased in boxes $u$, shown in fig. 2, the dotted lines indicating the wheel $o$.

The boxes $u$ are connected with the bottoms of the hoppers, and communicate with the hoppers and with the hose I. Suitable holes are made in the boxes $u$, through which the gear-shaft G is inserted.

Rectangular slots $g$ are formed through the bottoms of the hoppers, in which the teeth of the distributing-wheels $o$ work as these wheels revolve.

The tubular hose I are connected with hinged drag-bars $w$, to the under side of the front cross-piece of frame A, and these hose may be adjusted vertically by cords and pulleys, or sheaves, under the control of the driver.

A spring-clutch, $x$, is employed upon shaft G, and it has a shipping-lever, $y$, which actuates the clutch to throw the machine out of gear, and a spiral spring on shaft G may be used to cause the clutch to connect with pinion F, when not held out of contact by lever y.

The rear end of this lever is connected by a cord, z, with one of the cords l; and the two cords l l, which pass under sheaves, extend in front of the driver's seat L, and are connected with a bent metal rod, which is at the control of the driver, to be adjusted upon the rack-bar K, connected with the front of the standard which supports the driver's seat L.

By this arrangement of cords with the rear upper ends of the hose I and with shipping-lever y, the hose may be elevated at the same time that the unshipping of the gears is effected, which is necessary to be done when turning the machine around in the field.

The drag-bars w and hoppers D may be so connected with frame A as to admit of lateral adjustment with the operating mechanism to vary the distance between the rows to be planted.

The teeth of the distributing-wheels extend across the periphery of the wheels, and are spaced with intervals between them of about three-fourths of an inch.

Substitute distributers may be used, which may have longer spaces between the teeth to increase the quantity of seed to be planted.

The slot g in the bottoms of the hoppers is of just the width of the thickness of the distributing-wheels, and the spaces between the sides of the slots and between the teeth of the wheels o form pockets, in to which a small number of seeds will be deposited by the action of the feeding-arms s, which continuously move some of the seeds that they detach from the bulk within the hopper, outwardly to the periphery of the hopper-bottom, and cause them to be deposited in pocket or slot g; and as the wheel o rotates, the seeds thus deposited are carried under the hopper-bottom and fall through the hose I, which communicates with the box in which the distributing-wheel works.

From the foregoing description it will be seen that motion is communicated from the large gear-wheel E on axle B to pinion F, thence to the beveled pinions p, which mesh into the large horizontal gear-wheels H, thereby giving rotary motion to the curved feeding-arms s, and the distributer o rotates with the gear-shaft G.

Our machine is so organized that it can be used to distribute fertilizing materials in rows, either mixed with the seeds or separately.

Having fully described our improved cotton-seed planter,

We claim as our invention and desire to secure by Letters Patent—

The arrangement, in a cotton-seed planter, of the horizontally-rotating feeding-arms s upon the bottom of the cylindrical hopper D, in combination with the vertically-rotating distributer o, working in a slot at the periphery of the hopper-bottom, the parts being constructed and operated by a system of gearing, substantially as and for the purpose described.

In witness whereof we have hereunto set our hands this 27th day of January, 1871.

DE WITT C. ELLIS.
GEORGE N. DEMING.

Witnesses:
S. D. CORNWELL,
H. P. K. PECK.